United States Patent Office 3,470,228
Patented Sept. 30, 1969

---

3,470,228
PREPARATION OF ORGANIC ISOCYANATES
Dietrich H. Heinert, Midland, Mich., assignor to The Dow Chemical Company, Midland, Mich., a corporation of Delaware
No Drawing. Filed Oct. 26, 1966, Ser. No. 589,490
Int. Cl. C07c *119/04*
U.S. Cl. 260—453                                  10 Claims

ABSTRACT OF THE DISCLOSURE

Aliphatic and aromatic isocyanates are produced by pyrolyzing the corresponding isocyanurates at 500–1000° C. and less than 100 mm. absolute pressure. Unsaturated isocyanates such as vinyl isocyanate and vinylphenyl isocyanate are of particular interest as difunctional monomers.

---

The present invention relates to a new and improved process for making organic monoisocyanates. It relates particularly to a method for making certain unsaturated isocyanates which are valuable difunctional monomers.

A commonly used method for making organic isocyanates, the reaction of an amine with phosgene, is not feasible for the preparation of those isocyanates, whose corresponding amines are unstable, unreactive, or not easily available. Alternative processes for the synthesis of organic isocyanates such as the Curtius degradation of acid azides, the Lossen rearrangement of hydroxamic acid, the reaction of organic halides with silver cyanate, or the thermal decomposition of carbamates and ureas either require a corresponding amine or halide starting material or involve expensive reagents and critical reaction conditions.

The trimerization reaction undergone by many organic isocyanates in the presence of tertiary amines, tertiary phosphines, basic salts, and miscellaneous other catalysts to form the corresponding isocyanurate is well known. In general, that trimerization reaction has been considered to be irreversible as a practical matter, even at greatly elevated temperatures. Triphenyl isocyanurate has been reported to decompose to carbon dioxide and a condensation product when heated to 300° C. Vacuum pyrolysis of tris(2-hydroxyethyl) isocyanurate has been reported to yield an oxazolidinone. Triallyl isocyanurate has been thermally decomposed in the presence of caustic soda to yield a small amount of allyl isocyanate along with diallylurea and other decomposition products. The trimethyl ester of normal cyanuric acid has been pyrolyzed under high vacuum to yield methyl isocyanate, but the triethyl ester broke down under these conditions to produce cyanic acid and ethylene. Therefore, no effective general process is known by which isocyanurates can be converted to the corresponding isocyanate in good yield.

It has now been found that organic isocyanates can be obtained in good yield by subjecting the vaporized corresponding isocyanurate to apyrolytic temperature under high vacuum and in the absence of any basic or acidic inorganic reactant. Relatively high pyrolysis temperatures in the range 500–1000° C. are required. Optimum results are obtained at about 600–800° C. The pyrolysis is carried out at a maximum absolute pressure of about 100 mm. Hg. Preferably, the pyrolysis pressure is considerably lower, for example; best results usually produced at 0.01–10 mm.

This process is applicable to isocyanurates of the formula

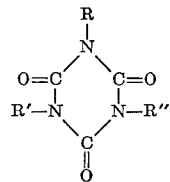

wherein R, R', and R'' are organic radicals taken from the group consisting of aliphatic hydrocarbon radicals of 1–4 carbon atoms and aromatic hydrocarbon radicals of 6–9 carbon atoms and their nuclearly monohalogenated derivatives where the halogen is fluorine or chlorine. The aliphatic hydrocarbon radicals thereby included are alkyl groups, for example, methyl, ethyl, propyl, isopropyl and butyl radicals and alkenyl radicals of 2–4 carbon atoms such as vinyl, allyl, and methallyl groups. Of particular interest in this process are compounds wherein R, R', and R'' each represent a 1-alkenyl group of 2–3 carbon atoms, i.e., they are independently vinyl, isopropenyl, or propenyl radicals. The formula then represents the homo-substituted compounds trivinyl isocyanurate, triisopropenyl isocyanurate, and tripropenyl isocyanurate and also the compounds having different substituents such as diisopropenyl propenyl isocyanurate, isopropenyl dipropenyl isocyanurate, and isopropenyl divinyl isocyanurate. These compounds are obtainable from a vinylation process whereby cyanuric acid is reacted with acetylene, methylacetylene, or a mixture of these at 150–225° C. in the presence of a zinc or cadmium catalyst as disclosed in my copending application, Ser. No. 589,537, filed Oct. 26, 1966. For example, trivinylisocyanurate is made by the vinylation with acetylene; triisopropenyl, tripropenyl, and mixed propenyl-isopropenyl isocyanurates are all produced by the vinylation with methylacetylene; and the vinylation reaction using a mixture of acetylene and methylacetylene produces the mixed $C_2$ and $C_3$ substituted isocyanurates.

The aromatic radicals represented in the above formula include the radicals phenyl, tolyl, vinylphenyl, isopropenylphenyl, benzyl, vinylbenzyl, fluorophenyl, chlorophenyl, vinylchlorophenyl, isopropenylchlorophenyl, fluorobenzyl, vinylchlorobenzyl, and the like, i.e., they are phenyl or benzyl radicals which may have a chlorine or fluorine substituent and additionally or separately an alkyl or alkenyl substituent of 1–3 carbon atoms. Such aromatic isocyanurates can be made by any of several known methods. One such method comprises the reaction of, for example, phenyl sodium with trichloroisocyanuric acid to produce triphenyl isocyanurate.

The product of the pyrolysis is an isocyanate or mixture of isocyanates depending upon the starting isocyanurate. For example, vinyl isocyanate is produced by the pyrolysis of trivinyl isocyanurate while the pyrolysis of diisopropenyl propenyl isocyanurate yields a corresponding mixture of isopropenyl and propenyl isocyanates.

The pyrolysis reactor may consist essentially of a hot tube, either open or packed with a suitable inert ceramic or metallic packing. The pyrolysis may also be accomplished by passing the isocyanurate vapor over a hot wire or through an electric arc. The pyrolyzed vapors can then be condensed to obtain the isocyanate product or those vapors can be employed in a secondary reaction to make another product. An inert diluent gas such as nitrogen or argon may be employed to facilitate passage of the vapors through the pyrolysis zone.

The feeding of the isocyanurate to the reactor may be facilitated, for example, when the isocyanurate is a high melting solid, by feeding it as a solution in an inert solvent. Aromatic hydrocarbons such as benzene, toluene, and naphthalene are examples of solvents which can be used. By the term inert is meant unreactive with the isocyanurate reactant or the isocyanate product, but not necessarily unchanged by passage through the pyrolysis zone. For example, a high melting isocyanurate can be dissolved in trivinyl isocyanurate and the liquid mixture fed to the reactor. The condensed product then would contain the corresponding two isocyanates which can be separated by distillation or by other conventional means.

The unsaturated isocyanates such as vinylisocyanate, isopropenyl isocyanate, vinylphenyl isocyanate, and vinylbenzyl isocyanate made available by this process are valuable difunctional monomers which are not readily available from known processes or are not provided thereby as pure or economically practical materials.

EXAMPLE 1

The pyrolysis reactor was a vertically disposed 3 cm. diameter high silica glass tube 50 cm. in length packed with 6 x 8 mm. high silica glass rings. The top 20 cm. of the reactor tube served as a preheater and evaporator and was maintained at 250° C. by external resistance heating. The lower 30 cm. was similarly maintained at 800° C. to serve as the cracking section. The bottom end of the tube was connected to a sump trap and this in turn was followed by three U traps. The sump trap was cooled by an ice bath and the first two U traps were cooled by liquid nitrogen. The last U trap was at room temperature and was attached to a vacuum line. Temperatures within the preheater and cracker sections of the reactor tube were measured by appropriately placed thermocouples.

With the temperatures within the tube at the levels noted above, 20.7 g. of trivinyl isocyanurate was introduced into the top of the tube at a rate of 10 ml./hr. The pressure within the system was initially adjusted to 0.1 mm. and thereafter maintained at 1.0 mm. by addition of nitrogen at the top of the reactor tube. After all of the trivinyl isocyanurate had been added, heating was continued as before for an additional 30 minutes. Heating was then stopped and the nitrogen inlet and vacuum line were both closed. The system was thus held at about 1.0 mm. pressure while the cooling bath was removed from the first U trap, thereby allowing the condensed product to melt and to distil into the second such trap. The system was then brought to atmospheric pressure by admission of nitrogen and the reaction products were allowed to warm to room temperature. The product in the second U trap was a clear, mobile liquid weighing 11.5 g. This material was found to be essentially pure vinyl isocyanate.

EXAMPLE 2

Using the apparatus and procedure described in Example 1, 20.7 g. of crude trivinyl isocyanurate was pyrolyzed at 800° C. and 1.0 mm. absolute pressure. About 12 g. of clear yellow liquid condensate was obtained in the second liquid nitrogen-cooled trap by the procedure described above. This condensate consisted essentially of about 90 percent by weight of vinyl isocyanate and about 10 percent of byproduct HCN.

EXAMPLE 3

Using the reactor tube described in Examples 1 and 2, 63.4 g. of distilled trivinyl isocyanurate was vaporized and passed through the reactor at a rate of 12.6 g./hr. The preheater temperature was set at 250° C. while the pyrolysis section was held at 660° C. and the pressure in the reactor tube was maintained at 1.0 mm. The bottom of the reactor tube was connected to a water-cooled condenser which in turn led to successive traps cooled respectively by solid carbon dioxide and liquid nitrogen.

At the end of the run, 56.1 g. of unreacted trivinyl isocyanurate was condensed in the first trap as a pale yellow liquid. From the liquid nitrogen cooled trap, there was recovered condensed vinyl isocyanate which was distilled under vacuum to obtain 5.2 g. of the purified compound, representing a 71.2 percent yield of pure vinyl isocyanate based on 11.5 percent conversion of the trimer.

EXAMPLE 4

Using the general procedure of the foregoing examples, trivinyl isocyanurate was pyrolyzed at various reactor temperatures using the preheater temperature, the feed rate, and the reactor pressure of Example 3. Conversions and yields were calculated as before.

| | Percent conversion | Percent yield (approx.) |
|---|---|---|
| Pyrolysis temp., ° C.: | | |
| 400 | <1 | |
| 500 | 2 | |
| 600 | 10 | 75 |
| 700 | 64 | 70 |
| 800 | 100 | 55 |
| 900 | 100 | 35 |

EXAMPLE 5

Methylacetylene was reacted with cyanuric acid in the presence of a zinc catalyst as previously described to obtain a product which was essentially a mixture of triisopropenyl isocyanurate and trisubstituted isocyanurates having both propenyl and isopropenyl substituents. This product is fed to the pyrolysis reactor in liquid form, either molten or as a solution in an inert solvent, as shown in the foregoing examples to obtain a similar conversion to the monomeric isocyanate. The isocyanate product is found to be a mixture of propenyl isocyanate and isopropenyl isocyanate.

EXAMPLE 6

In the apparatus described in Examples 1 and 2, 24.9 g. of triallyl isocyanurate was pyrolyzed by the same general procedure except that the nitrogen flow was omitted and the cracking section of the reactor tube was maintained at 750° C. Pressure within the reactor was maintained at 3 mm. absolute. The condensed effluent was distilled to obtain 1.7 g. of unreacted triallyl isocyanurate, 2.0 g. of allyl isocyanate, and 0.5 g. of 1,3-diallyl-4-iminoparabanate (from the reaction of allyl isocyanate with byproduct hydrogen cyanide).

EXAMPLE 7

A hot wire pyrolysis reactor was constructed of a vertically disposed high silica glass tube 6 cm. in diameter and about 30 cm. long having supported within it a loose winding on a glass spindle of 80 cm. of 28 gauge platinum wire. The ends of the wire were attached to terminal posts sealed into the closed top of the tube, which posts were in turn attached to a variable source of electrical current. The open bottom end of the glass tube was connected by a glass joint to a 50 ml. flask. The upper portion of the reactor tube was connected through a sidearm to two traps cooled by liquid nitrogen and so to a vacuum line.

A quantity of 35.7 g. of triphenyl isocyanurate was put in the flask and the entire system was evacuated to 0.1 mm. absolute pressure and closed. The two traps were immersed in liquid nitrogen while the flask was heated to 300–350° C. and current was passed through the platinum wire to bring it to a bright red heat. The triphenyl isocyanurate gradually sublimed over the glowing wire and a white solid was condensed in the first trap. The pressure within the reactor remained essentially constant at 0.1 mm. during the sublimation process. The surface temperature of the glowing wire during the pyrolysis was estimated at 650–800° C. After two hours, the apparatus was allowed to cool to room temperature and the system was brought to atmospheric pressure by admission of nitrogen. The material in the cold trap melted to a clear colorless liquid, weight 10.9 g. It was identified as essentially pure phenyl isocyanate. From the sides of the reactor tube there was recovered 24.5 g. of unreacted sublimed phenyl isocyanate.

Procedures such as described in the foregoing examples are similarly applied to the production of the corresponding isocyanates by the pyrolysis of other isocyanurates as previously described. The particular procedure and apparatus used is preferably chosen according to the type of isocyanurate to be pyrolyzed. For example, a reactor and procedure such as described in Examples 1 and 2 is adapted to the pyrolysis of alkyl and alkenyl isocyanurates.

In this manner, trimethyl isocyanurate is cracked to methyl isocyanate, tributyl isocyanurate is pyrolyzed to butyl isocyanate, and trimethallyl isocyanurate is pyrolyzed to methallyl isocyanate.

For aromatic isocyanurates which are sublimable solids, it may be desirable to employ an apparatus and procedure such as described in Example 7. In this way, tris(vinylbenzyl) isocyanurate is pyrolyzed to obtain vinylbenzyl isocyanate, tris(vinylchlorophenyl) isocyanurate is converted to vinylchlorophenyl isocyanate, and tris(vinylphenyl) isocyanurate is converted to vinylphenyl isocyanate.

I claim:
1. A process for making an organic isocyanate which consists essentially of subjecting the vapor of an isocyanurate having the formula

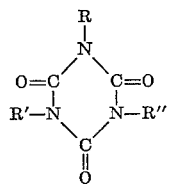

to a temperature of 500–1000° C. at an absolute pressure no greater than about 100 mm. Hg for a time sufficient to cause significant pyrolysis of said isocyanurate to the corresponding isocyanate, wherein R, R' and R" in the formula each represent an alkyl radical of 1–4 carbon atoms, an alkenyl radical of 2–4 carbon atoms, an aromatic hydrocarbon radical of 6–9 carbon atoms, or a nuclearly monohalogenated aromatic hydrocarbon radical of 6–9 carbon atoms wherein the halogen is fluorine or chlorine.

2. The process of claim 1 wherein R, R' and R" are alkenyl radicals of 2–4 carbon atoms.
3. The process of claim 2 wherein R, R' and R" are vinyl radicals.
4. The process of claim 2 wherein R, R', and R" are 1-alkenyl radicals of 3 carbon atoms.
5. The process of claim 1 wherein R, R', and R" are aromatic hydrocarbon radicals of 6–9 carbon atoms.
6. The process of claim 5 wherein R, R', and R" are vinylphenyl radicals.
7. The process of claim 5 wherein R, R', and R" are vinylbenzyl radicals.
8. The process of claim 1 wherein R, R', and R" are nuclearly monohalogenated aromatic hydrocarbon radicals of 6–9 carbon atoms wherein the halogen is fluorine or chlorine.
9. The process of claim 1 wherein the temperature is 600–800° C.
10. The process of claim 1 wherein the pressure is 0.01–10 mm.

References Cited

UNITED STATES PATENTS 2,580,468  1/1952  Schaefer et al. _____ 260—453

OTHER REFERENCES

Frazier et al.: J. Organic Chemistry, pages 1944–5 relied upon, vol. 25 (1960).

CHARLES B. PARKER, Primary Examiner

D. H. TORRENCE, Assistant Examiner

U.S. Cl. X.R.

260—77.5, 248